(12) United States Patent
Boss et al.

(10) Patent No.: US 6,465,110 B1
(45) Date of Patent: Oct. 15, 2002

(54) METAL FELT LAMINATE STRUCTURES

(75) Inventors: Daniel E. Boss, Grayslake; Richard K. Williams, Chicago, both of IL (US); Scott R. Dobrusky, Gary, IN (US)

(73) Assignee: Material Sciences Corporation, Elk Grove Village, IL (US)

( * ) Notice: Subject to any disclaimer, the term of this patent is extended or adjusted under 35 U.S.C. 154(b) by 0 days.

(21) Appl. No.: 09/685,208

(22) Filed: Oct. 10, 2000

(51) Int. Cl.[7] .................. B32B 15/01; B32B 15/14; F16D 65/02; F16L 9/21
(52) U.S. Cl. .................. 428/608; 428/605; 138/141; 138/147; 138/149; 188/251 M
(58) Field of Search .................. 428/608, 605; 138/141, 147, 149; 188/251 M (56) References Cited

U.S. PATENT DOCUMENTS

| | | | |
|---|---|---|---|
| 2,113,766 A | | 4/1938 | Newport et al. |
| 2,953,849 A | | 9/1960 | Morgan |
| 3,442,479 A | | 5/1969 | Barnett et al. |
| 3,627,444 A | | 12/1971 | Lentz |
| 3,778,184 A | | 12/1973 | Wood |
| 3,904,377 A | | 9/1975 | Honda et al. |
| 3,906,128 A | * | 9/1975 | Burling et al. |
| 3,936,550 A | | 2/1976 | Carlson et al. |
| 4,029,838 A | | 6/1977 | Chamis et al. |
| 4,093,768 A | | 6/1978 | Cordts et al. |
| 4,110,505 A | | 8/1978 | Prewo |
| 4,115,611 A | | 9/1978 | Stoltze et al. |
| 4,217,157 A | | 8/1980 | Stoltze et al. |
| 4,252,378 A | | 2/1981 | DeBolt et al. |
| 4,294,005 A | | 10/1981 | Brennan |
| 4,300,978 A | * | 11/1981 | Whitemore et al. |
| 4,318,453 A | * | 3/1982 | Rose et al. |
| 4,338,380 A | | 7/1982 | Erickson et al. |
| 4,353,951 A | | 10/1982 | Yukitoshi et al. |
| 4,404,992 A | | 9/1983 | Sasaki et al. |
| 4,410,013 A | | 10/1983 | Sasaki et al. |
| 4,421,811 A | * | 12/1983 | Rose et al. |
| 4,465,725 A | * | 8/1984 | Riel |
| 4,475,634 A | | 10/1984 | Flaim et al. |
| 4,484,967 A | | 11/1984 | Watanabe et al. |
| 4,523,666 A | | 6/1985 | Murray |
| 4,587,161 A | | 5/1986 | Barrell et al. |
| 4,629,397 A | | 12/1986 | Schweitzer |
| 4,650,723 A | | 3/1987 | Furuya |
| 4,694,895 A | | 9/1987 | Wöhrl |
| 4,729,871 A | | 3/1988 | Morimoto |
| 4,732,806 A | | 3/1988 | Wycech |

(List continued on next page.)

FOREIGN PATENT DOCUMENTS

| | | | |
|---|---|---|---|
| DE | 34 24 704 | * | 2/1986 |
| EP | 0 412 826 A2 | | 8/1990 |
| JP | 6-349516 | | 12/1994 |

OTHER PUBLICATIONS

Patent Abstracts of Japan—06349516 Dec. 22, 1994.

Primary Examiner—Deborah Jones
Assistant Examiner—Jason Savage
(74) Attorney, Agent, or Firm—Seyfarth Shaw (57) ABSTRACT

A laminate comprises first and second metal layers, and a metallic felt layer disposed between the metal layers and attached to each to provide vibrational damping and thermal insulation. In one embodiment, the layers are tubular in shape and form an automotive exhaust pipe. In another embodiment the layers are annular in shape and form a disk of a brake rotor. In another embodiment the laminate is a damping structure for a brake pad assembly, wherein the first metal layer may either be the backing plate of the brake pad assembly or be attached to the backing plate. The damping structure may include additional metallic felt and metal layers. Various modes of attachment of the metallic felt layer to the metal layers are disclosed. The metallic felt layer may be completely surrounded by metal.

28 Claims, 11 Drawing Sheets

U.S. PATENT DOCUMENTS

| | | | |
|---|---|---|---|
| 4,735,260 A | * | 4/1988 | Wohrl et al. |
| 4,737,398 A | | 4/1988 | Ikenaga et al. |
| 4,761,216 A | | 8/1988 | Cawlfield |
| 4,828,932 A | * | 5/1989 | Morimoto et al. |
| 4,833,005 A | | 5/1989 | Klaar et al. |
| 4,838,030 A | | 6/1989 | Cramer |
| 4,838,031 A | | 6/1989 | Cramer |
| 4,859,530 A | | 8/1989 | Roark et al. |
| 4,950,553 A | | 8/1990 | Walsh et al. |
| 4,978,582 A | | 12/1990 | Stamm et al. |
| 5,028,490 A | | 7/1991 | Koskenmaki et al. |
| 5,037,706 A | | 8/1991 | Lin et al. |
| 5,049,435 A | | 9/1991 | Uno et al. |
| 5,080,306 A | | 1/1992 | Porter et al. |
| 5,084,357 A | | 1/1992 | Imai et al. |
| 5,092,952 A | | 3/1992 | Minnick et al. |
| 5,139,117 A | | 8/1992 | Melinat |
| 5,145,729 A | * | 9/1992 | Padden |
| 5,163,289 A | | 11/1992 | Bainbridge |
| 5,185,198 A | | 2/1993 | Lefeber et al. |
| 5,196,253 A | | 3/1993 | Mueller et al. |
| 5,200,256 A | | 4/1993 | Dunbar |
| 5,286,574 A | | 2/1994 | Foster |
| 5,326,647 A | | 7/1994 | Merz et al. |
| 5,337,940 A | | 8/1994 | Woods et al. |
| 5,376,426 A | | 12/1994 | Harpell et al. |
| 5,403,653 A | | 4/1995 | Moreton et al. |
| 5,415,932 A | | 5/1995 | Bishop et al. |
| 5,418,073 A | | 5/1995 | Loth et al. |
| 5,509,993 A | | 4/1996 | Hirschvogel |
| 5,578,384 A | | 11/1996 | Kingston |
| 5,660,924 A | | 8/1997 | Yamaji et al. |
| 5,783,298 A | | 7/1998 | Herring, Jr. et al. |
| 5,878,843 A | | 3/1999 | Saum |

\* cited by examiner

METAL FELT LAMINATE STRUCTURES

BACKGROUND OF THE INVENTION

This invention relates to laminate structures, and more particularly, to laminate structures that have thermal insulation and vibration damping properties and structures incorporating the laminates therein.

In the past, laminate structures having insulation material between outer metal skin layers have been used to provide thermal insulation and vibration and noise control in a variety of applications. These laminates typically includes two outer metal layers and an interior layer of ceramic, glass cloth or asbestos.

Many of these laminates suffered because the insulation layers were not weldable to the skins or the entire laminate was not weldable to another structure. This limits the flexibility of the use of these laminates with other structures and the ability to form the laminates into finished products, such as tubing. Many of the insulation layers of the laminates also did not have structural integrity, further limiting such laminates.

SUMMARY

It is a general object of the present invention to provide an improved laminate which avoids the disadvantages of prior laminates while affording additional structural and operational advantages.

An important feature of the invention is the provision of a laminate which is of a relatively simple and economical construction.

A still further feature of the invention is the provision of a laminate of the type set forth, which is lightweight and provides vibration and noise damping properties and acts as a thermal insulator.

A further feature of the invention is the provision of a laminate of the type set forth, layers of which can be welded together, and which laminate can be welded to another structure.

Yet another feature of the invention is the provision of a brake shoe assembly including a damper formed of the laminate which aids in reducing vibration and noise in use.

Another feature of the invention is the provision of tubing formed of the laminate, which may be used in various automotive and other applications.

Yet another feature of the present invention is the provision of a brake rotor formed with a metal felt core layer which provides noise and vibration damping properties.

Certain ones of these and other features of the invention may be attained by providing a laminate including first and second metal layers respectively having first and second interior surfaces, and a metallic felt layer attached to and disposed over the majority of each of the first and second interior surfaces.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
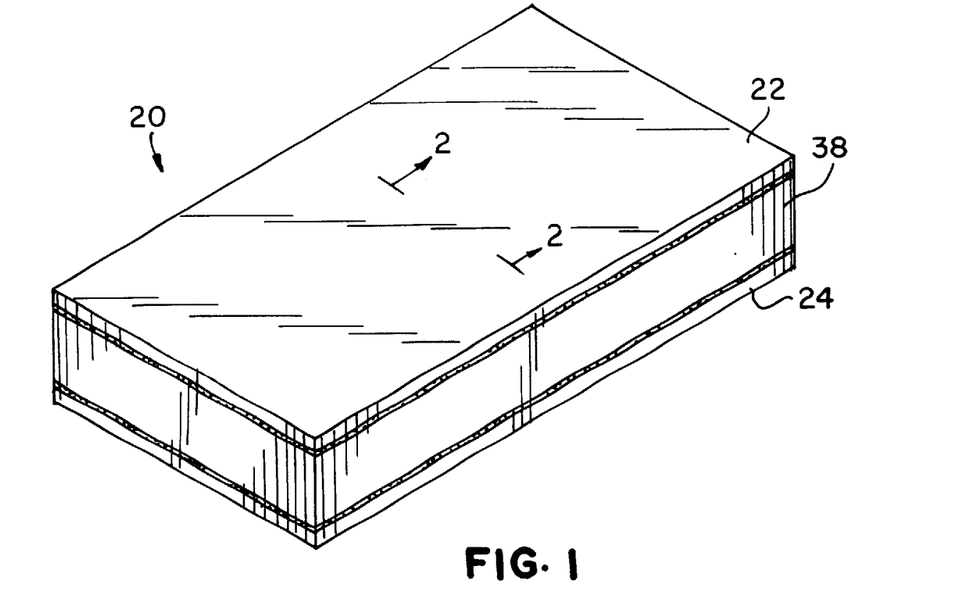
FIG. 1 is a perspective view of a laminate of the present invention.
Figure 2:
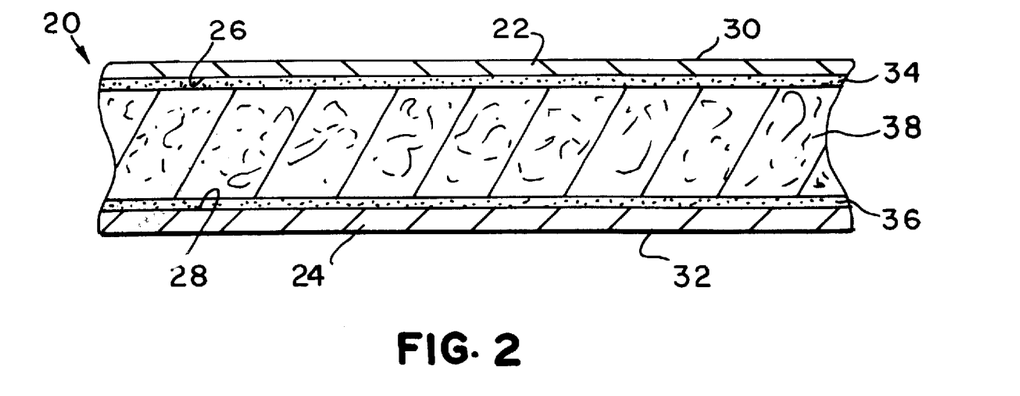
FIG. 2 is an enlarged, fragmentary sectional view taken generally along the line 2—2 of FIG. 1.

Referring to FIGS. 1 and 2, a laminate 20 of the present invention is shown. The laminate 20 includes two metal layers 22, 24, respectively having interior surfaces 26, 28 and exterior surfaces 30, 32. As seen in FIG. 2, the interior surfaces 26, 28 respectively have adhesive layers 34, 36 disposed thereon. Disposed between the adhesive layers 34 and 36 is a metallic felt layer 38. As seen in FIG. 1, the metallic felt layer 38 is preferably disposed over substantially the entire surface area of both of the interior surfaces 26, 28.

The metal layers 22 and 24 can be formed of any of many metals, including aluminum, stainless steel and cold rolled steel, and each may have a thickness of from about 0.010 inch to about 0.060 inch. The metallic felt layer 38 can be formed of a variety of metallic felts, including those made of stainless steel, carbon steel and aluminum. These metallic felts preferably have a mean fiber width of from about 40 to about 120 $\mu$m. The metallic felt layer 38 may also include up to about 10% by weight of a polymeric fiber, such as polyester, or polypropylene. The metallic felt layer 38 also may have a basis weight of from about 400 to about 1600 g/m$^2$. A preferred metallic felt layer 38 is one formed of a metallic felt sold by Global Material Technologies, Inc. under the designation SSW-Poly Metric Type CMX textile with 10% polyester fiber by weight.

Metallic felts are widely known. Generally metallic felt is a mat of metal fibers (not unlike steel wool) which has undergone a felting process. The felting process increases the density of the matting with a series of rollers. At the same time, the three-dimensional strength and cohesion of the material is increased by a series of needling devices. These needling devices punch through the thickness of the mat from the top and bottom, pulling fibers with them and causing the fibers to intertwine with one another. The intertwined fibers give the material greater tensile strength in all directions.

The adhesive layers 34, 36 may be formed of a polymeric adhesive, e.g. a film of an ionomer resin such as Surlyn Ionomer made by E.I. DuPont de Nemours, or a preceramic adhesive, such as one sold under the designation Ceraset SN Inorganic Polymer by Commodore Polymer Technologies, Inc. Such a preceramic adhesive is capable of maintaining a bond between the metallic felt layer 38 and the metal layers 22, 24 at temperatures exceeding 1200° F. The adhesive layers 34, 36 may also include electrically conductive microparticles, such as iron, zinc, nickel, aluminum or their alloys, to improve conduction through the adhesive layers 34, 36 to boost weld quality. The micro particles may have a mean diameter of from about 0.0005 inch to 0.002 inch.

Figure 3:
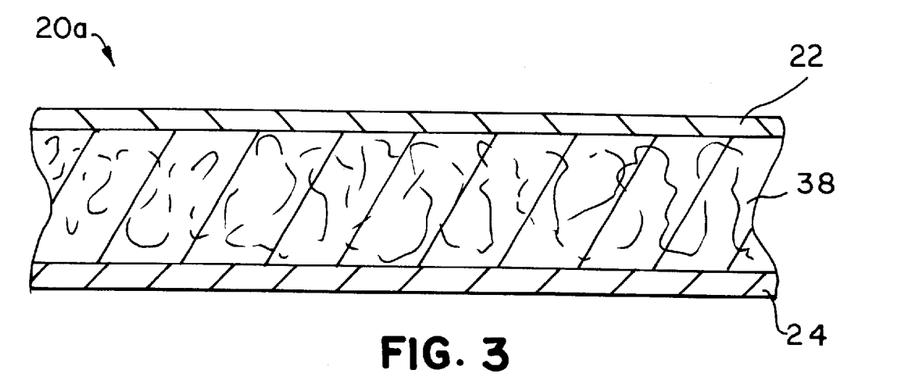
FIGS. 3 and 4 are sectional views, similar to FIG. 2, of alternate laminate embodiments.
Figure 4:
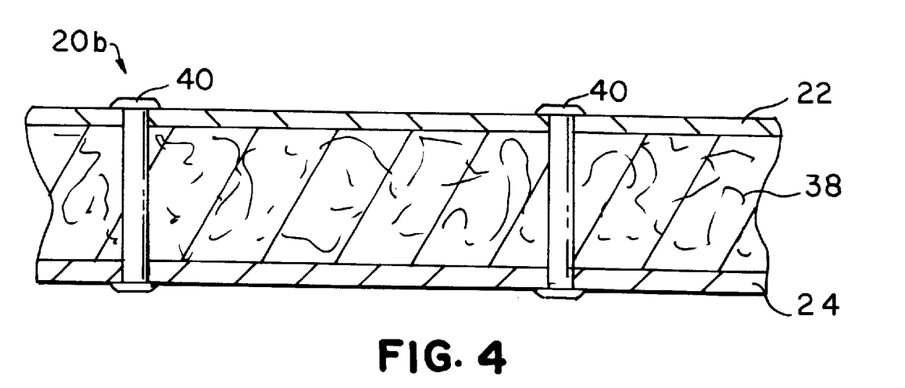

As seen in FIGS. 3 and 4, laminates 20a and 20b are similar to laminate 20 but without the adhesive layers 34, 36. As seen in FIG. 3, laminate 20a includes the metal layers 22, 24 welded to the metallic felt layer 38. In FIG. 4, laminate 20b includes the metal layers 22, 24 riveted, or otherwise mechanically fastened, to the metallic felt layer 38 by a series of rivets 40 or other suitable fasteners. Alternating, self-fastening systems could be used.

The laminates 20, 20a, 20b serve as effective thermal barriers and can be used in a variety of products, including automotive heat shields and muffler wraps. The laminates 20, 20a, 20b can be formed into finished parts by conventional sheet forming techniques.

The laminates 20, 20a, 20b could be respectively formed by stacking the individual layers and hot pressing the structure, by welding the structures or by mechanically fastening the layers. For providing larger volumes of laminate, conventional continuous coil to coil manufacturing methods may be used. The finished laminates may be collected and stored in a roll form.

Figure 5:
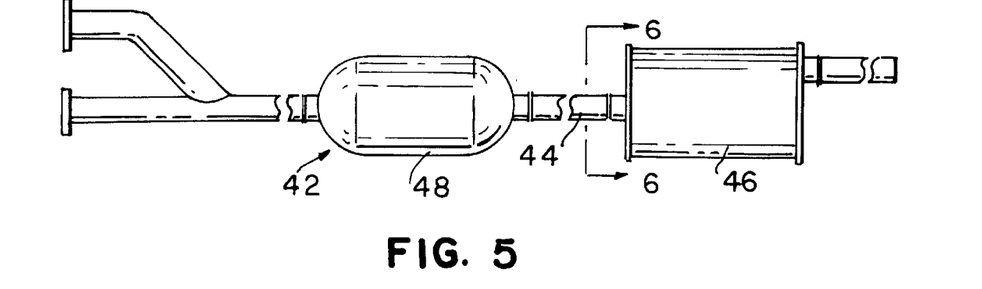
FIG. 5 is a top plan view of a motor vehicle exhaust system with portions broken away.
Figure 6:
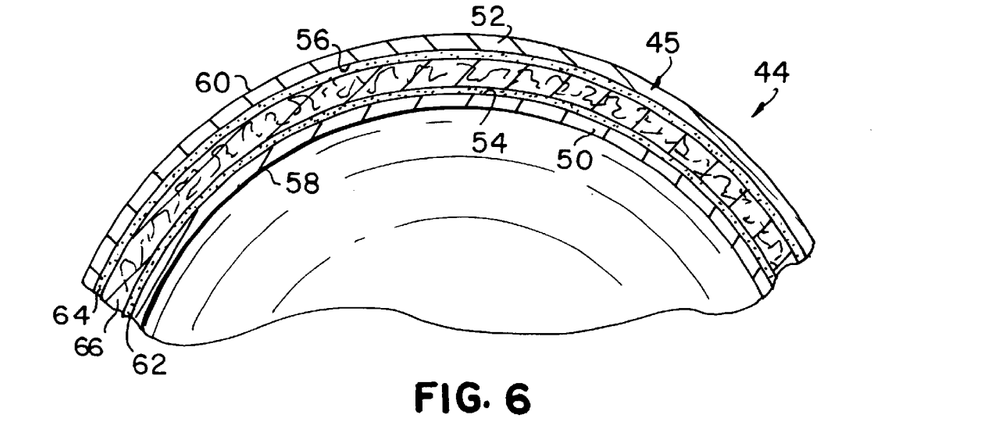
FIG. 6 is an enlarged, fragmentary, sectional view taken generally along line 6—6 of FIG. 5.

The laminates can also be used to form tubing, such as that used for automotive exhaust systems. Referring to FIG. 5, an automotive exhaust system 42 is illustrated. The automotive exhaust system 42 includes an exhaust pipe 44 connecting a muffler 46 to a catalytic converter 48 in a known manner. Referring to FIG. 6, the exhaust pipe 44 is formed of tubing 45 including inner and outer metal layers 50, 52, respectively having interior surfaces 54, 56 and exposed surfaces 58, 60. The interior surfaces 54, 56 respectively have adhesive layers 62, 64 disposed thereon. Disposed between the adhesive layers 62, 64 is a metallic felt layer 66. The metal layers 50, 52 can be formed of the same materials as layers 22 and 24. Each may have a thickness of from about 0.005 inch to about 0.060 inch. The exposed surface 60 of the outer metal layer 52 can have a corrosion resistant metallic coating, such as aluminum or zinc. The adhesive layers 62, 64 can be formed of the same materials as adhesive layers 34, 36 and can include electrically conductive microparticles, as necessary. The metallic felt layer 66 can also be formed of the same materials as the metallic felt layer 38. The outer metal layer may have an outside diameter of from about 1.5 inches to about 2.5 inches. The inner metal layer 58 can have an outside diameter of from about 1.0 inches to about 2 inches. As discussed below, the tubing 45 provides thermal insulation and sound damping properties.

Figure 7:
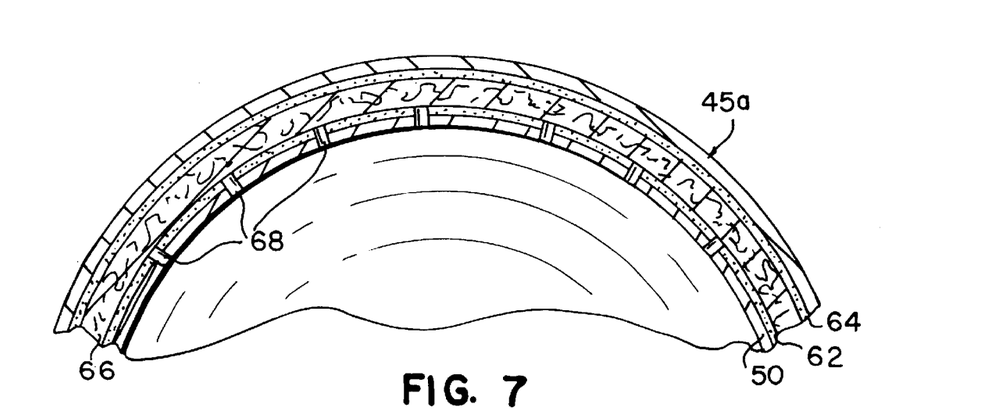
FIG. 7 is a view similar to FIG. 6 of an alternate tubing embodiment.

As seen in FIG. 7, tubing 45a is shown which is substantially identical to tubing 45, except that the inner metal layer 50 has a plurality of perforations 68 to allow exhaust gas to pass through to the metallic felt layer 66 for the purpose of aiding sound dissipation.

Though the tubing 45 and 45a in FIGS. 6 and 7 have adhesive layers 62, 64, either tubing may be formed without these layers. Thus, the tubing could be held together by frictional forces between the metallic felt layer 66 and the inner and outer metal layers 50, 52.

The tubing 45 may be formed in a conventional tube mill with any of the laminates 20, 20a, 20b. For example, strips of laminate 20 may be fed directly to the tube mill, and progressively rolled into a tube and seam welded shut. Additionally, the same process may be used with laminates, similar to laminate 20, except that the adhesive layers 34, 36 do not extend to the edges of the metal layer 22 of adhesive materials so as to improve the weld quality.

Figure 8:
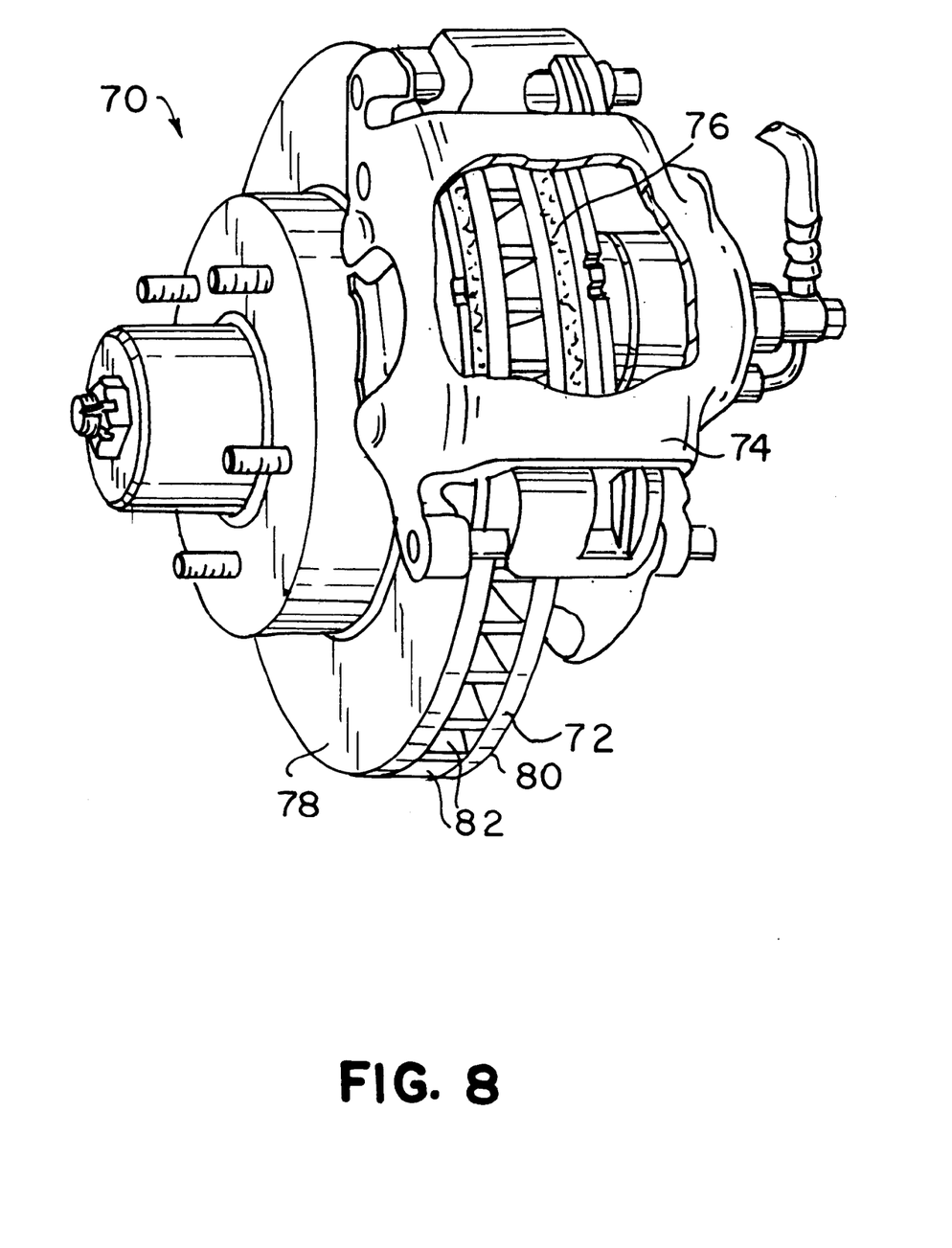
FIG. 8 is a perspective view of a rotor and brake shoe assembly of the present invention, partially broken away.
Figure 9:
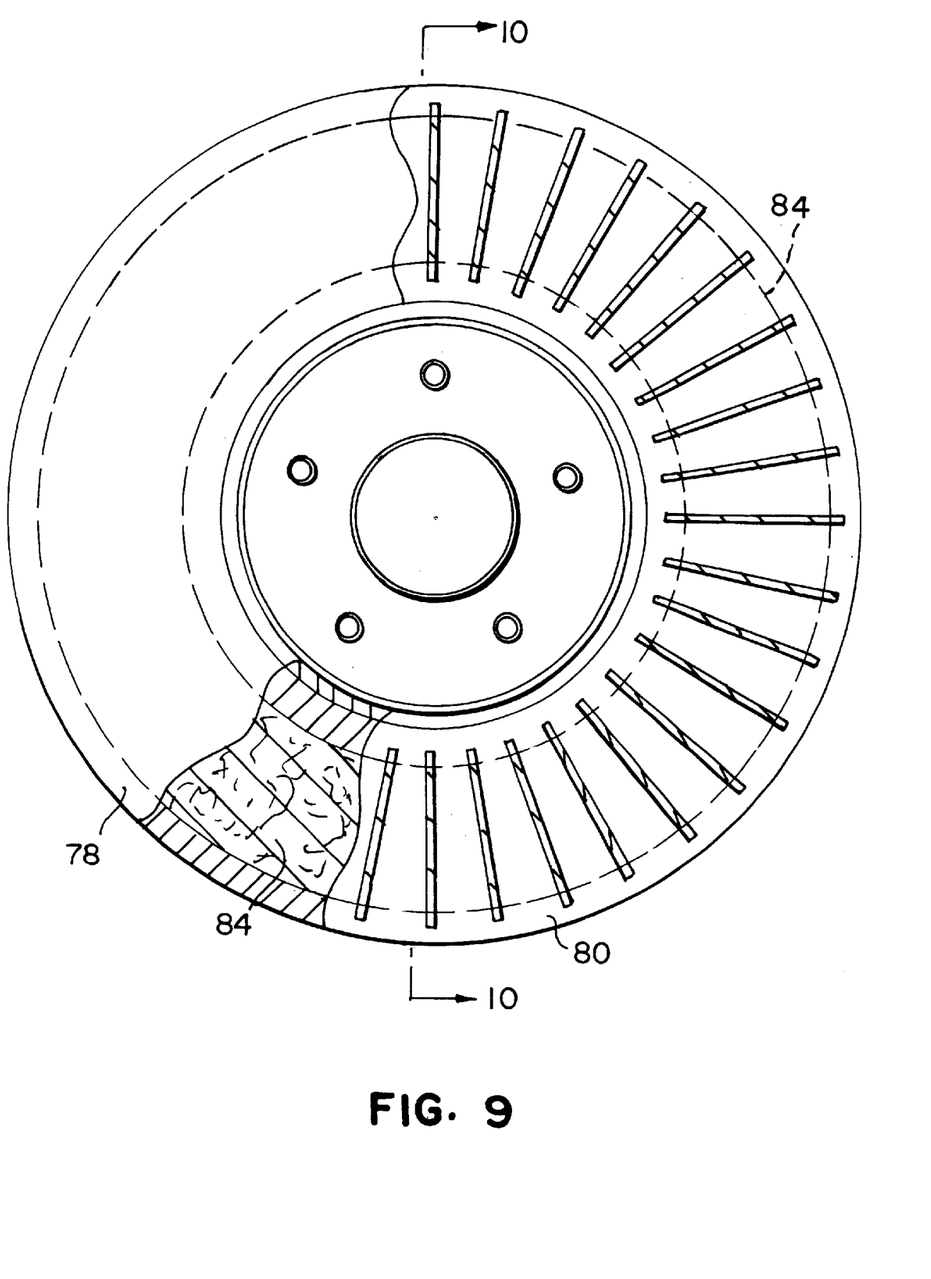
FIG. 9 is an enlarged, side elevational view of the rotor of FIG. 8 partially broken away.
Figure 10:
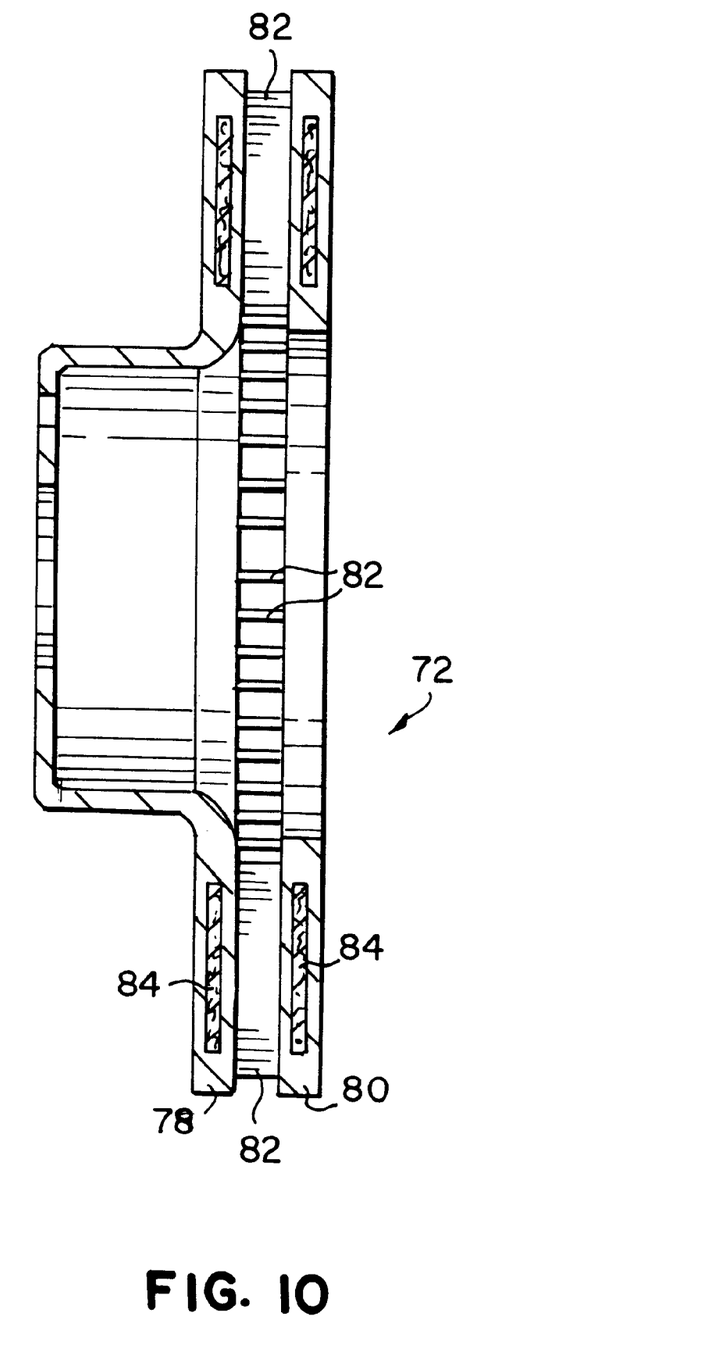
FIG. 10 is a sectional view taken generally along line 10—10 of FIG. 9.

The metallic felt structures of the present invention can be utilized in automotive braking systems. Referring to FIGS. 8–10, an automotive brake system 70 for one wheel includes a rotor 72, a caliper 74 and a pair of brake shoe assemblies 76 (one shown). As seen in FIGS. 8 and 10, the rotor 72 includes two generally parallel annular disks 78, 80 separated by and connected to a plurality of cooling blades 82. Each disk 78, 80 has a metallic felt, flat, annular layer 84 disposed within a solid metal portion 86 formed from a metal, such as cast iron, steel, nickel-based alloy or composite materials. The metallic felt layer 84 can be formed of any of the metallic felts discussed above.

Figure 11:
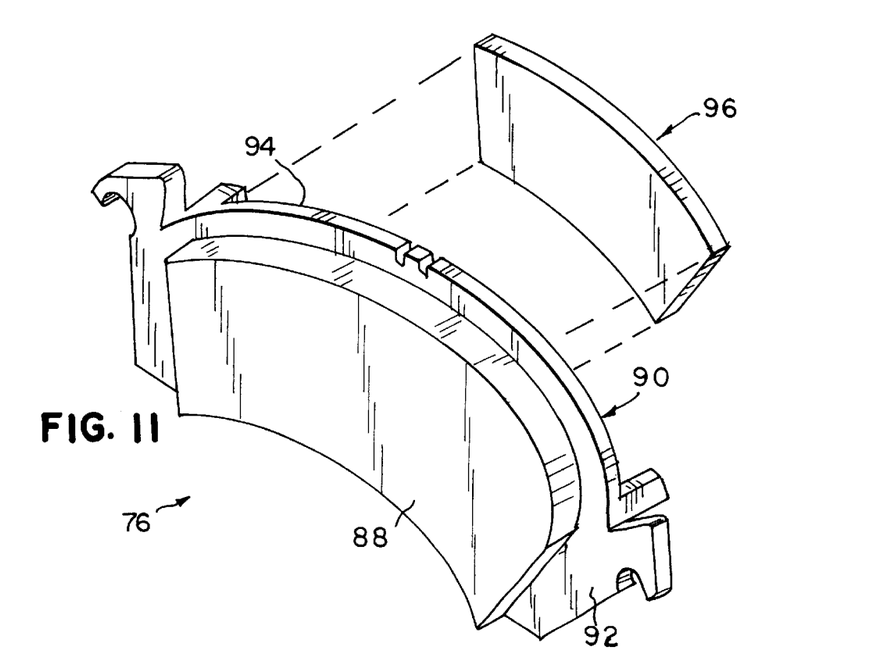
FIG. 11 is a perspective view of a brake shoe assembly, with the brake damper, shown in block form, exploded away from the remainder of the assembly.

As seen in FIG. 11, the brake shoe assembly 76 includes a conventional brake pad 88 for frictionally engaging a disk (78 or 80). The brake pad 88 is coupled to a backing plate 90 in a known manner. The backing plate 90 has a rotor-facing side 92 and an exterior side 94. The brake shoe assembly 76 also includes a brake damper 96 coupled to the exterior side 94 of the backing plate 90 and which includes one or more metallic felt layers.

Figure 12:
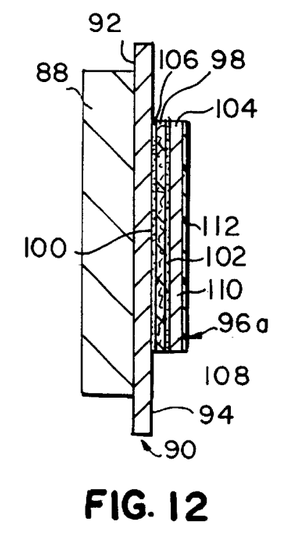
FIGS. 12–14 are schematic sectional views of brake shoe assemblies with different brake dampers attached to the backing plate.

FIG. 12 shows a first brake damper 96a which includes a metallic felt layer 98 having first and second sides 100, 102 respectively coupled to the exterior side 94 of the backing plate 90 and a metal layer 104 by adhesive layers 106, 108. The metal layer 104 also has an exterior surface 110 covered by a exterior coating layer 112.

Figure 13:
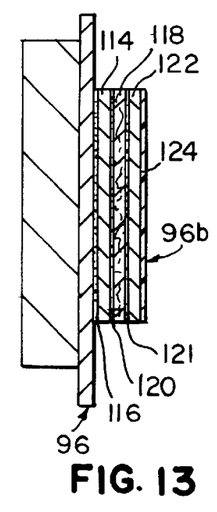

FIG. 13 shows an alternative brake damper 96b coupled to the backing plate 90. The brake damper 96b includes a first metal layer 114 coupled to the backing plate 90 by an adhesive layer 116 and to a metallic felt layer 118 by another adhesive layer 120. The metallic felt layer 118 is coupled by an adhesive layer 121 to another metal layer 122 having an exterior surface with an exterior coating layer 124.

Figure 14:
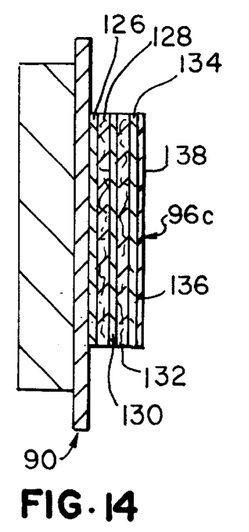

FIG. 14 shows a third brake damper 96c coupled to the backing plate 90 including a first metal layer 126 welded to the backing plate 90 and to a metallic felt layer 128. The metallic felt layer 128 is welded to a second metal layer 130, which is coupled to a layer 132, which is also coupled to a third metal layer 134 having an exterior surface 136 having an exterior coating layer 138.

The metal layers 104, 114, 122, 126, 130 and 134 may be formed of the same metals as the metal layers 22, 24 of laminates discussed above. Each of the metal layers 104, 114, 122, 126, 130 and 134 may have a thickness of from about 0.009 inch to about 0.040 inch.

The adhesive layers 106, 108, 116, 120 and 121 may also be formed of the same material as adhesive layers 34, 36 and may include electrically conductive particles, such as metal microparticles discussed above, to improve weldability. The adhesive layers 106, 108, 116, 120 and 121 are also preferably formed of a material that provides vibration damping properties. Additionally, one or more of the adhesive layers 106 and 116, may be removed, in which case the brake dampers 96a, 96b may be attached to the brake shoe 90 by welding. Additionally, the other adhesive layers 108, 120 and 121 may also be removed and the individual layers of the brake damper 96a and 96b may be welded together.

The layer 132 may be a metallic felt layer formed of the same materials previously discussed or any of a number of viscoelastic materials, e.g., polymer adhesives, such as acrylic, nitrile rubbers, silicones, phenolics and mixtures thereof, which provides vibration damping properties.

Figure 15:
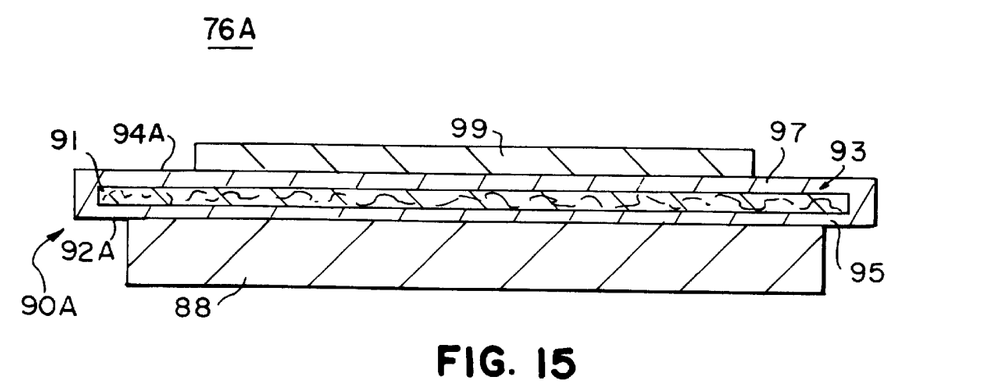
FIG. 15 is a schematic sectional view of another embodiment of brake shoe assembly.

Referring to FIG. 15, there is illustrated a modified brake shoe assembly 76A which includes a backing plate 90A with a side 92A, to which is secured the conventional brake pad 88, and a side 94A. The backing plate 90A includes a core metallic felt layer 91 completely surrounded by a metal shell 93, which defines a layer 95 to which the brake pad 88 is attached and a layer 97 to which a shim/insulator 99 may optionally be attached. The core metallic felt layer 91 may be formed of the same material previously discussed.

EXAMPLE 1

Tests were performed to quantify the thermal insulation values of different laminate structures (4"×8" samples). Laminates (samples 1 and 2) had the same construction as laminate 20, discussed above. A sample 3, consisting of 2 layers of steel separated by a ⅛" air gap created by five narrow spacers (⅛" wide×8" long×⅛" thick parallelly aligned and generally equally spaced) was also evaluated in the study for comparison. The tests measured the temperature drop through small panels exposed to a radiant heat source. The configurations of the test sample are listed in Table 1 below.

TABLE 1

|  | Metal Layer | Adhesive Layer | Insulating Layer | Adhesive Layer | Metal Layer |
| --- | --- | --- | --- | --- | --- |
| Sample 1 | .012" thick Cold Rolled Steel | .0015" thick Surlyn Ionomer Adhesive | .125" thick Carbon Steel Felt (1520 g/m² basis weight) with 10% by weight polyester fiber | .0015" thick Surlyn Ionomer Adhesive | .012" thick Cold Rolled Steel |
| Sample 2 | .012" thick Cold Rolled Steel | .0015" thick Surlyn Ionomer Adhesive | .15" thick Stainless Steel Felt (1650 g/m² basis weight) | .0015" thick Surlyn Ionomer Adhesive | .012" thick Cold Rolled Steel |
| Sample 3 | .012" thick Cold Rolled Steel | none | none (five - .125" thick Air Gap spacers) | none | .012" thick Cold Rolled Steel |

Figure 16:
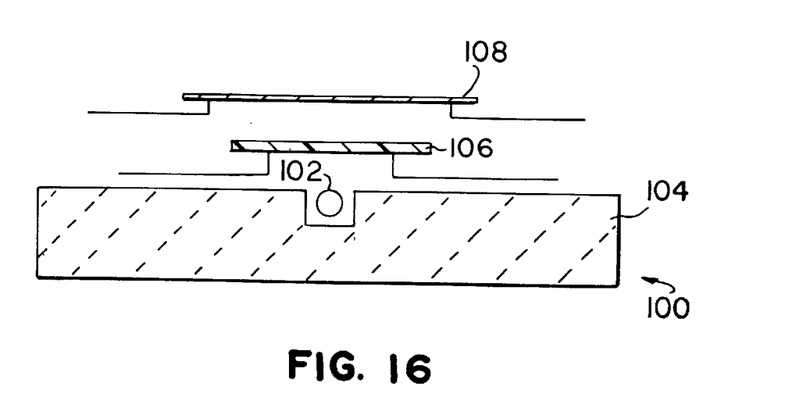
FIG. 16 is a schematic representation of the thermal testing equipment used to test the present invention and comparison samples.

This testing was carried out in testing apparatus depicted in FIG. 16. The apparatus 100 includes a heating element 102 consisting of a 250-watt cylindrical cartridge heater (6" long×0.75" dia.). A temperature controller, operated on a constant manual power setting, regulated the power output to the heating element 102. The heating element 102 is enclosed on three sides with low density, ceramic firebrick 104. Four steel stands support the test sample 106, at each corner (two shown), with minimal contact area. A 6"×8" stainless steel plate 108 is mounted 1" above the test sample 106 to create a somewhat enclosed environment like that of a typical exhaust pipe. A type K thermocouple embedded in the heater, and additional thermocouples cemented on the top and bottom of each test sample 106, measured temperature during testing. Temperature data was recorded as a PC data file via an electronic data logger. The entire apparatus was contained in an insulated box, with access from the top side.

The samples 106 were placed 1" above the heating element 102. The system was allowed to reach steady state and temperatures were recorded every 30 seconds for 30 minutes. The heating element 102 reached temperatures between 1200–1300° F. which correspond to bottom side temperatures of 800–1050° F. on the panel. Table 2 displays average steady state temperature drop through the samples.

TABLE 2

Average Steady State Temperatures

| Sample # | Heater T (° F.) | Bottom T (° F.) | Top T (° F.) | ΔT (° F.) |
| --- | --- | --- | --- | --- |
| 1 | 1220 | 1046 | 703 | 343 |
| 2 | 1271 | 971 | 622 | 327 |
| 3 | 1229 | 847 | 655 | 191 |

As seen by ΔT of samples 1 and 2 from Table 2, the metallic felt laminate structures will provide excellent thermal insulation.

EXAMPLE 2

In addition to measuring the thermal insulating ability of the laminates of the present invention, a study was also conducted to examine the metal felt structure's ability to damp vibrations or lessen noise.

A laminate (sample 4) made in accordance with laminate 20 of FIGS. 1 and 2 was tested vs. a solid 0.03" thick Cold Rolled Steel sample (sample 5). The samples consisted of the following layer materials:

|  | Metal Layer | Adhesive Layer | Insulating Layer | Adhesive Layer | Metal Layer |
| --- | --- | --- | --- | --- | --- |
| Sample 4 | .012" thick Cold Rolled Steel | .0015" thick Surlyn Ionomer Adhesive | .125" thick Steel Felt (1500 g/m² basis weight w/10% polyethylene fiber by weight) | .0015" thick Surlyn Ionomer Adhesive | .015" thick Cold Rolled Steel |
| Sample 5 | .03" thick Cold Rolled Steel | none | none | none | none |

The samples were tested as follows. A 4" wide×8" long sample was placed inside a room-temperature oven on a foam rubber mat, which approximated a free boundary condition (to eliminate interaction with oven). An accelerometer, used to measure the acceleration of the sample over various frequencies, was bonded near the edge of each sample (1" from a first longitudinal end and at the center of the width of the sample) with an alkyl cyanoacrylate "super glue". The sample was then impacted five times with an impact hammer on the end of the sample opposite the accelerometer (1" from the second longitudinal end and at the center of the width of the sample.) The hammer used in this experiment was a Modally Tuned® hammer, with a 4" long handle and approximately a 0.025" diameter tip. The tip had a force transducer mounted behind it to measure the force upon impact. The accelerometer had an approximate diameter of 0.125" and was less than 1 oz. and was classified as lightweight. The force of the impacts, as well as the responses measured by the accelerometer, were recorded and averaged by a data analyzer (Star System v5.2–Star Modal®). The analyzer used the data to produce a frequency response curve, displaying compliance (displacement/force) vs. frequency. Different bending modes of the sample correspond to different peaks on the frequency response curve. A particular mode or frequency was selected ($3^{rd}$ mode in the present case) and the composite loss factor was determined in a known manner and plotted vs. temperature as shown in FIG. 17.

Figure 17:
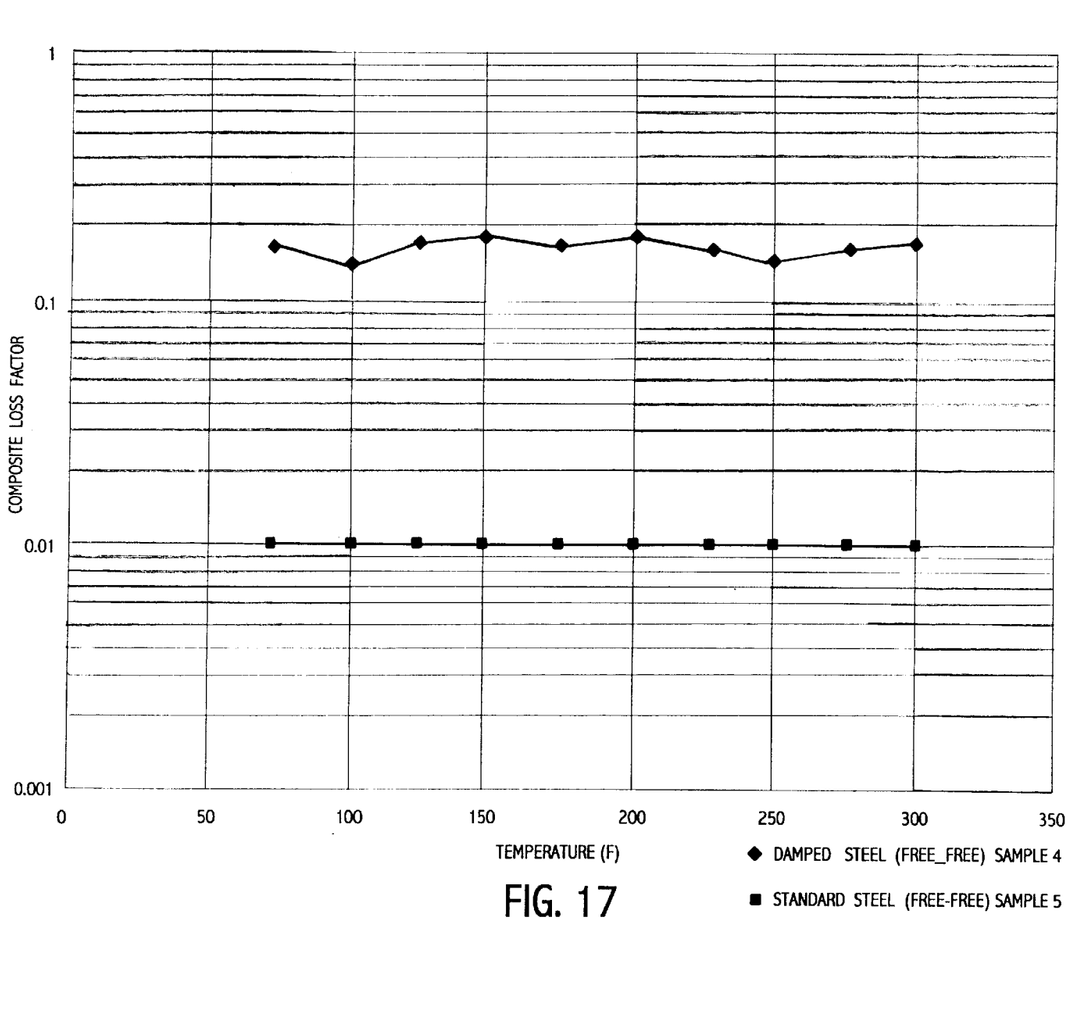
FIGS. 17–19 are plots of composite loss factor versus temperature, based upon vibration testing of the products of the present invention and comparison samples.

The above procedure was repeated at 25° F. intervals up to 300° F. and the composite loss factors were then plotted vs. temperature (FIG. 17). As seen in FIG. 17, the laminates of the present invention have a substantially constant composite loss factor over a wide temperature range, which is substantially greater than the solid cold roll steel sample at each temperature tested.

Figure 18:
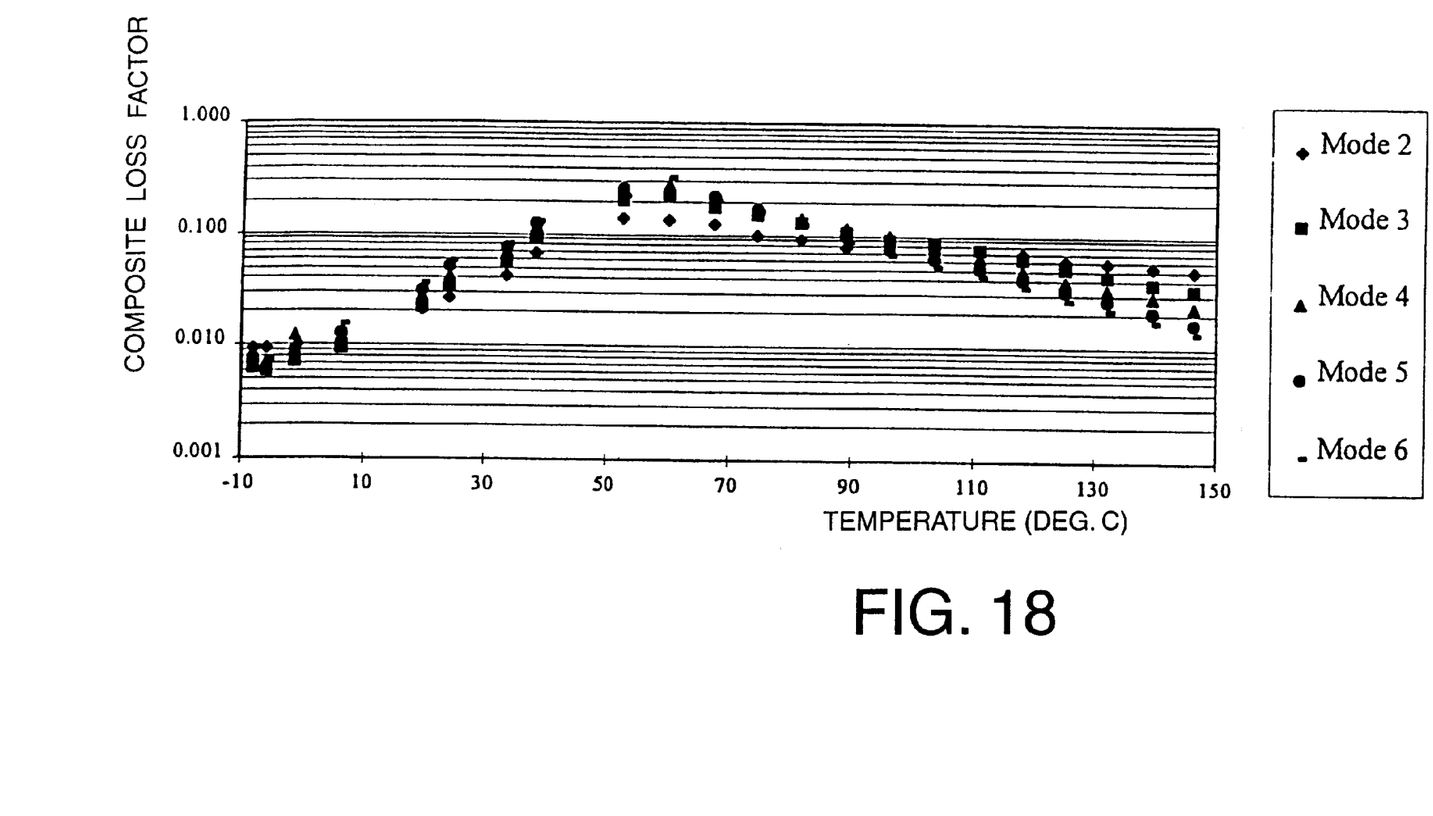

For comparison, a laminate without metal felt formed of the following layers 0.020" thick cold rolled steel, 0.001" thick acrylic adhesive, 0.020" thick cold rolled steel was also tested by the same method, except that the sample was 1" wide×8" long. (It is believed that 4"×8" samples would have behaved similarly.) As seen in FIG. 18, the viscoelastic laminate sample does not have a substantially constant composite loss factor over a wide temperature range. This is important because different systems operate at different temperature ranges, meaning that the viscoelastic laminates would not be useful for some systems, whereas the laminates of the present invention could be used on a wide range of systems.

EXAMPLE 3

The same vibration testing or modal analysis was done on two different prototype exhaust tubes (samples 6 and 7) and was compared to a solid steel tube (sample 8). Samples 6 and 7 were made in accordance with tubing 45 (FIG. 3). Samples 6–8 measured 1 ft. by 2.25" OD and had the following layers:

|   | Metal Layer | Adhesive Layer | Insulating Layer | Adhesive Layer | Metal Layer |
|---|---|---|---|---|---|
| Sample 6 | .045" thick Cold Rolled Steel | .003" thick Surlyn Ionomer Adhesive | .125" thick Carbon Steel Felt (1500 g/m² basis weight) | .003" thick Surlyn Ionomer Adhesive | .045 thick Cold Rolled Steel |
| Sample 7 | .02" thick Stainless Steel | .003" thick Surlyn Ionomer Adhesive | .125" thick Carbon Steel Felt (1500 g/m² basis weight) | .003" thick Surlyn Ionomer Adhesive | .02" thick Stainless Steel |
| Sample 8 | .045" thick Cold Rolled Steel | | | | |

Figure 19:
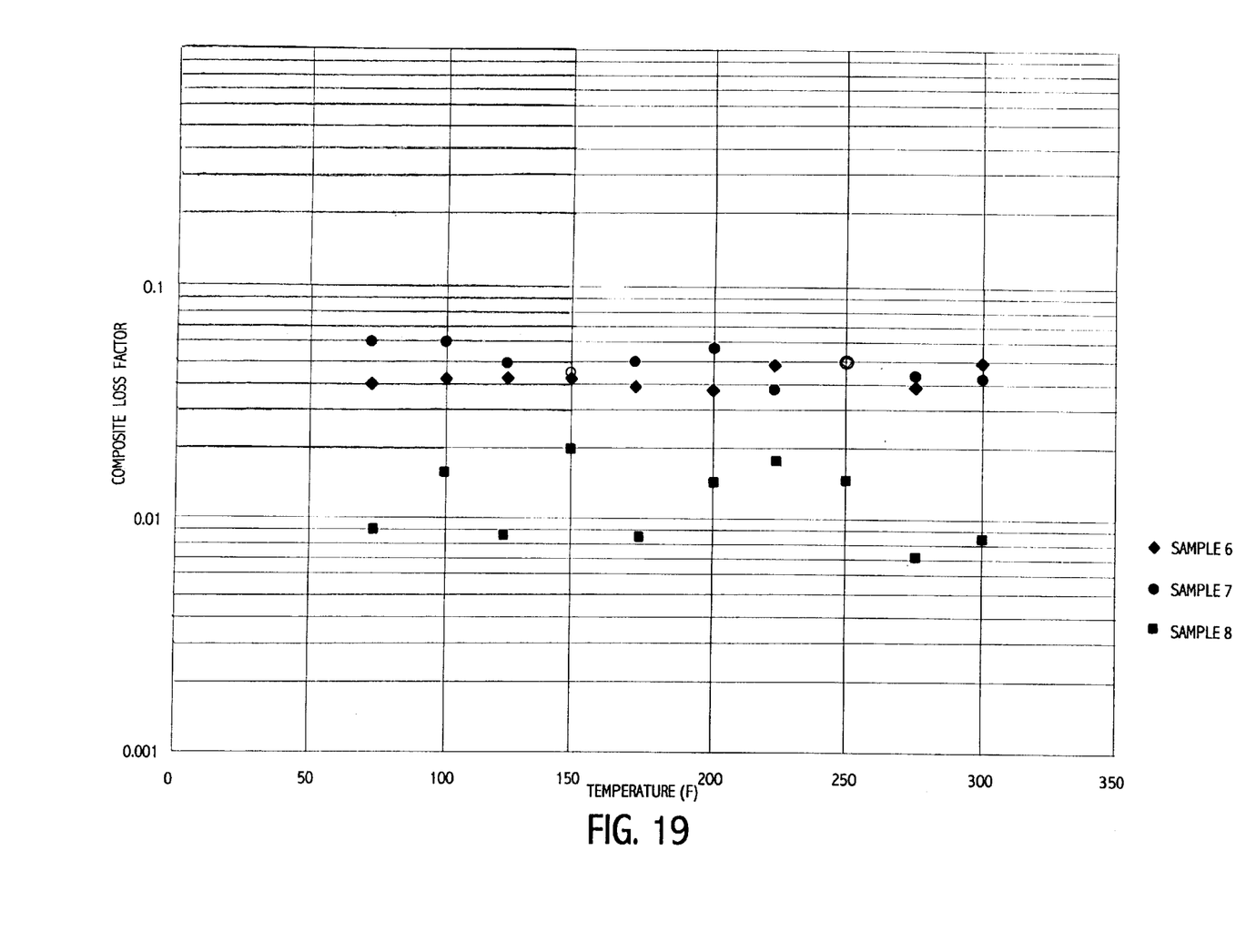

The accelerometer, described above, was placed 1" from one longitudinal end of the tube and the impact hammer delivered blows 1" from the other longitudinal end of the tube. Like the vibration analysis of the laminates in Example 2, the analysis measured the frequency response of the pipes to mild impact over a specified temperature range (75–300° F.) to determine the composite loss factor at each temperature for a predetermined frequency. FIG. 19 is a plot of the composite loss factors (for a predetermined frequency) vs. temperature for the 3 samples evaluated. As seen in FIG. 19, the tubes with the metallic felt layers displayed significant damping improvement (had higher composite loss factors) over the solid steel tube throughout the entire temperature range. FIG. 19 also shows that the damping performance (or composite loss factor) of the metal felt tubing remained close to constant over the temperature range tested.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A laminate comprising:
   first and second imperforate metal layers respectively having first and second substantially smooth continuous interior surfaces; and
   a metallic felt layer of only fibrous material attached to and disposed over the majority of each of the first and second interior surfaces.

2. The laminate of claim 1, wherein the metallic felt layer is formed from a metal selected from the group consisting of stainless steel, carbon steel and aluminum.

3. The laminate of claim 1, wherein the metallic felt has a basis weight in the range of from about 400 g/m² to about 1600 g/m².

4. The laminate of claim 3, wherein the metallic felt has a mean fiber width in the range of from about 40 μm to about 120 μm.

5. The laminate of claim 1, wherein the metallic felt layer includes a polymeric fiber.

6. The laminate of claim 5, wherein the polymeric fiber comprises less than about 10% by weight of the metallic felt layer.

7. The laminate of claim 1, wherein the metallic felt layer is adhesively attached to the first and second metal layers.

8. The laminate of claim 1, wherein the metallic felt layer is welded to the first and second metal layers.

9. The laminate of claim 1, wherein the metallic felt layer is secured to the first and second metal layers by fasteners.

10. Multi-layer tubing comprising:
    inner and outer substantially cylindrical metal walls defining a space therebetween; and a metallic felt layer attached to and disposed between the inner and outer walls, the metallic felt layer filling the majority of the space between the inner and outer walls.

11. The tubing of claim 10, wherein the metallic felt layer is formed from a metal selected from the group consisting of stainless steel, carbon steel and aluminum.

12. The tubing of claim 10, wherein the metallic felt has a basis weight in the range of from about 500 g/m$^2$ to about 1500 g/m$^2$.

13. The tubing of claim 12, wherein the metallic felt has a mean fiber width in the range of about 40 μm to about 120 μm.

14. The tubing of claim 10, wherein the metallic felt layer includes a polymeric fiber.

15. The tubing of claim 14, wherein the polymeric fiber comprises less than about 10% by weight of the metallic felt layer.

16. The tubing of claim 10, wherein the tubing forms an automotive exhaust pipe.

17. A vibrationally damping and thermally insulating apparatus comprising:
   first and second imperforate metal layers respectively having first and second substantially smooth continuous interior surfaces; and
   a metallic felt layer of only fibrous material disposed between the first and second layers and attached to each and disposed over the majority of each of the first and second interior surfaces.

18. The apparatus of claim 17, wherein each of the layers is tubular.

19. The apparatus of claim 18, wherein the apparatus is an automotive exhaust pipe.

20. The apparatus of claim 17, wherein each of the layers is annular in shape.

21. The apparatus of claim 20, wherein the layers cooperate to form a disk of an automotive brake rotor.

22. The apparatus of claim 21, wherein the felt layer is completely surrounded by the disk.

23. The apparatus of claim 17, wherein the apparatus forms a portion of an automotive brake shoe assembly including a backing plate.

24. The apparatus of claim 23, wherein one of the metal layers is the backing plate.

25. The apparatus of claim 23, wherein the first metal layer is attached to the backing plate.

26. The apparatus of claim 25, and further comprising a second metallic felt layer attached to the second metal layer.

27. The apparatus of claim 17, wherein the layers cooperate to form a backing plate of an automotive brake shoe.

28. The apparatus of claim 27, wherein the felt layer is completely surrounded by the backing plate.

* * * * *